No. 630,872. Patented Aug. 15, 1899.
R. EGE.
DEVICE FOR HOISTING AND UNLOADING WAGON BODIES.
(Application filed Nov. 22, 1898.)
(No Model.) 3 Sheets—Sheet 1.
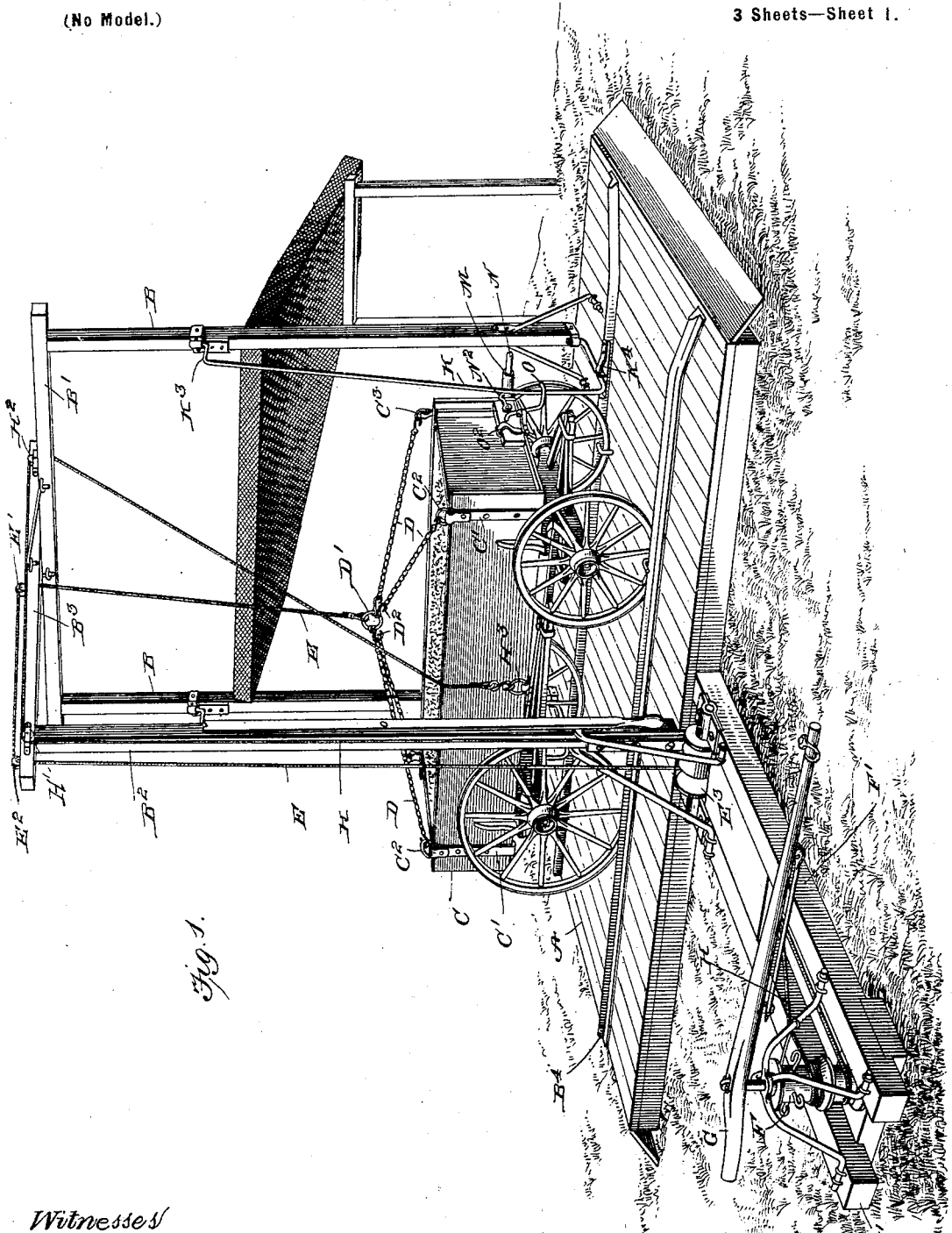
Witnesses
Inventor
Ralph Ege.
by
Attorneys No. 630,872. Patented Aug. 15, 1899.
R. EGE.
DEVICE FOR HOISTING AND UNLOADING WAGON BODIES.
(Application filed Nov. 22, 1898.)
(No Model.) 3 Sheets—Sheet 2.
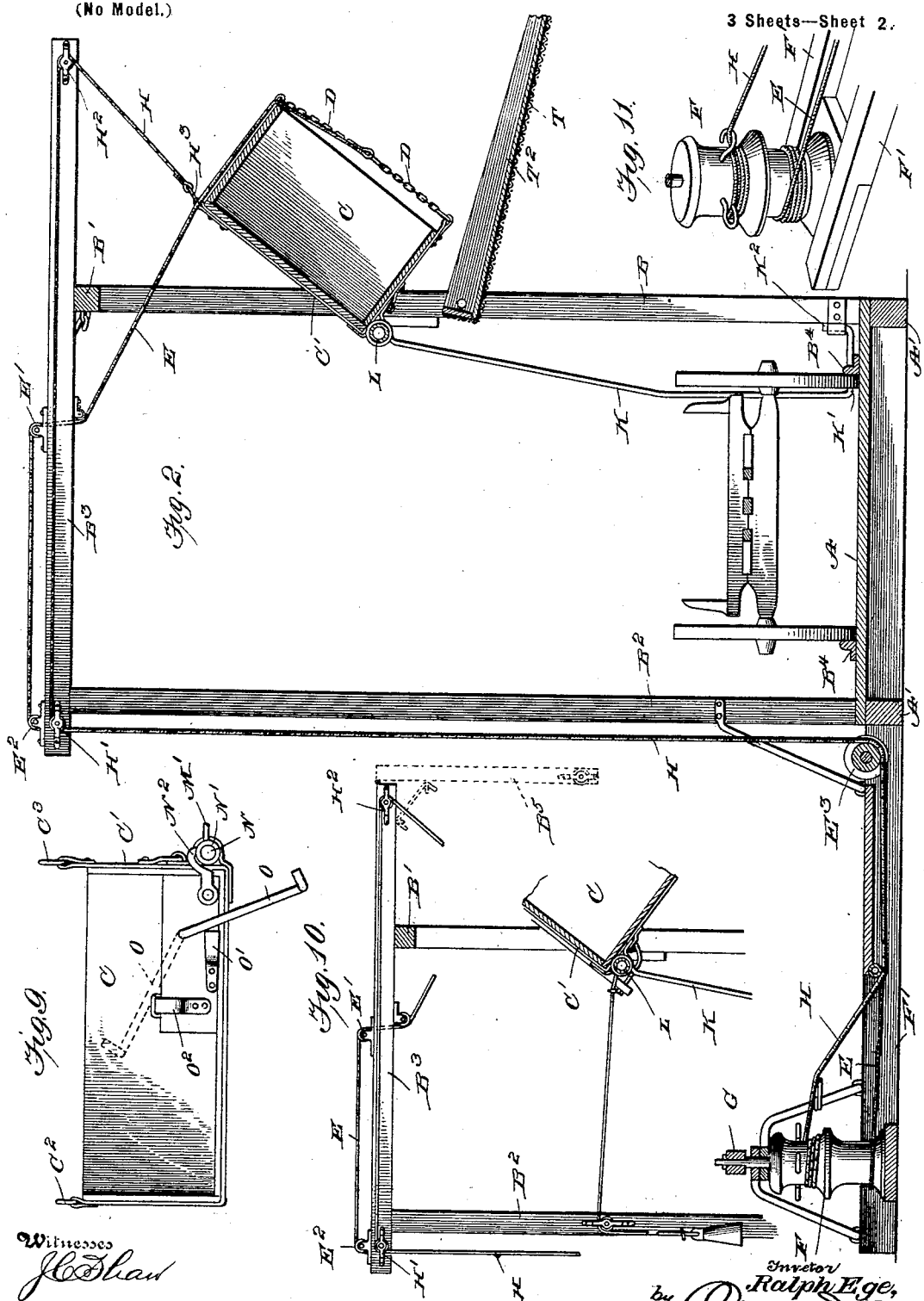

No. 630,872. Patented Aug. 15, 1899.
R. EGE.
DEVICE FOR HOISTING AND UNLOADING WAGON BODIES.
(Application filed Nov. 22, 1898.)
(No Model.) 3 Sheets—Sheet 3.
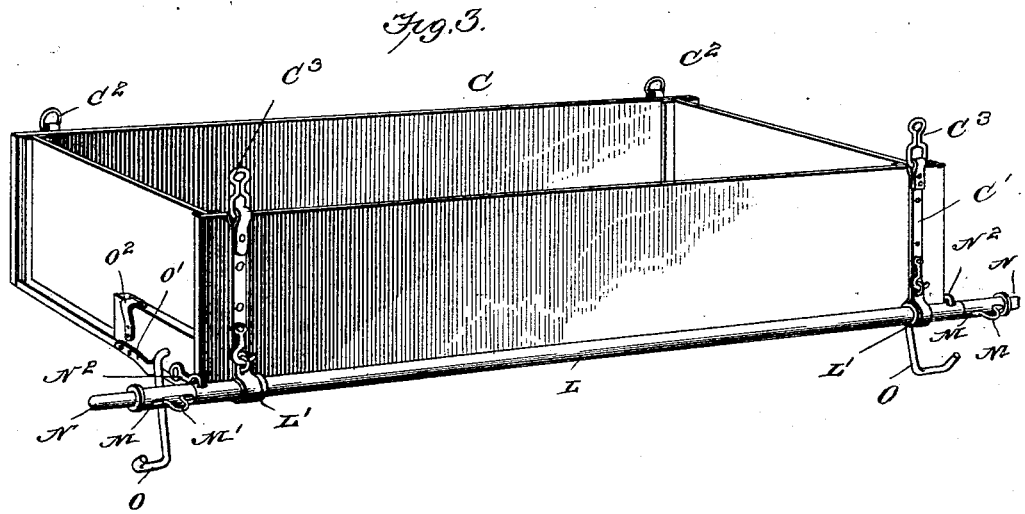
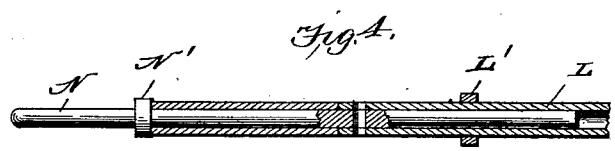
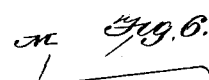
Inventor
Ralph Ege,
Witnesses

UNITED STATES PATENT OFFICE.

RALPH EGE, OF HOPEWELL, NEW JERSEY.

DEVICE FOR HOISTING AND UNLOADING WAGON-BODIES.

SPECIFICATION forming part of Letters Patent No. 630,872, dated August 15, 1899.

Application filed November 22, 1898. Serial No. 697,210. (No model.)

*To all whom it may concern:*

Be it known that I, RALPH EGE, a citizen of the United States, residing at Hopewell, in the county of Mercer and State of New Jersey, have invented a new and useful Device for Hoisting and Unloading Wagon-Bodies, of which the following is a specification.

This invention relates generally to loading and unloading devices, and more particularly to one intended for use for raising or elevating a loaded wagon from the running-gear thereof and then dumping the contents of such wagon-body; and my invention is particularly adapted for unloading grain and ice and can be used for discharging the grain or other material into a car, crib, or other place of storage or transport.

The prime object of the invention is to provide a device embodying these qualities which can be easily set up or taken down at any desired point and can be readily moved about from place to place.

Another object of the invention is to provide a device of the kind described which can be used in connection with any construction of wagon-body now in use.

Another object of the invention is to provide a device by means of which the wagon-body can be dumped from the side instead of from the end, thereby enabling the operator to drive up alongside the dumping-place and therefore avoiding the tedious operation of backing up to the dumping-place.

Another object is to provide for the automatic dumping of the wagon-body after it has reached a definite height and also provide for the return and descent of the wagon-body, all through the medium of a single drum or windlass.

With these various objects in view my invention consists in the peculiar construction of the various parts and in the novel manner of combining, arranging, and operating the said parts, all of which will be fully described hereinafter and pointed out in the claims.

In the drawings forming part of this specification, Figure 1 is a perspective view of an apparatus or device constructed in accordance with my invention. Fig. 2 is a vertical sectional view, partly in elevation, illustrating the position of the various parts while the wagon-body is being dumped. Fig. 3 is a detail perspective view of the wagon-body. Fig. 4 is a detail sectional view, partly in elevation, showing the connection between the tubular shaft and the connecting-bar. Fig. 5 is a detail view of the bar. Fig. 6 is a detail view of the bearing-sleeve. Fig. 7 is a detail perspective view of the tubular shaft or rod. Fig. 8 shows a slight modification by means of which the invention can be applied to any of the wagons now in use. Fig. 9 is an end view illustrating the tripping-arms. Fig. 10 is a detail view showing certain modifications in the dumping arrangements. Fig. 11 is a detail view of the winding-drum.

In carrying out my invention I employ a base or platform A, mounted upon suitable sills or runners A' in order that the device may be dragged from place to place, and, if desired, suitable rollers may be arranged at the ends of the sills, which rollers can be lowered when it is desired to transport the apparatus and thrown out of the way whenever it becomes necessary to render the device stationary. Upright standards B B are attached to the sill at one side of the platform, and are connected to the top by a cross-beam B', and are braced at their lower ends by means of suitable brace-rods. An upright standard $B^2$ is arranged upon the opposite side of the platform midway between the uprights B and is connected at its upper end with the cross-beam B' by a top beam $B^3$, said top beam projecting some distance beyond the cross-beam B' for the purpose of carrying a pulley, hereinafter referred to. A suitable track $B^4$ is fastened upon the platform in order to act as a guide when driving the wagon upon the platform for the purpose of hoisting and dumping the body thereof, said track being widened at each end for the purpose of facilitating the entrance of the wagon-wheels between the rails.

The wagon-body C may be of the usual construction, such as usually employed upon farms for the purpose of hauling grain, and at each end of the wagon-body I arrange stout metal bands or straps C', which straps or bands pass under the bottom of the body and up each side and terminate in rings $C^2$ and $C^3$, respectively, the rings $C^3$ being arranged upon the side adjacent to the dumping-place and are elevated slightly above the rings C² upon the opposite side of the body. Chains D are fastened in the rings C² and C³ and are connected to a ring D' by means of hooks D², said hooks being employed in order that the proper link of the chain can be connected, so that in case the ground is irregular the body can be lifted into a level position. A stout cable E is attached to the ring D' and passes up through the top beam B³ and over a pulley E', mounted upon the top of said beam, near the center of the same, and then over another pulley E², also mounted upon the top of said beam, near the forward end, said cable then passing downwardly through the beam under a pulley E³ and connected to a winding-drum or windlass F, said windlass being mounted in a suitable frame arranged at the outer end of the supplemental beams F', attached to one of the main beams or sills A', adjacent to the upright standard B², said supplemental beams or sills being braced in a suitable manner, and they are also so connected to the main beams or sills that they can be readily detached whenever it becomes necessary, and it will also be noted that the uprights and cross-beams are similarly arranged in order that the device may be quickly and easily set up and taken down as desired.

The pulley E³ is mounted between supplemental beams or sills F', and a suitable covering F² is arranged to cover the space between these sills in order that the horse operating the sweep G may not interfere with the cable E as it passes to the drum, said sweep G being attached to the upper end of the drum-shaft in such a manner as to permit its ready attachment or detachment, as desired.

The drum F is preferably made double—that is, with an upper and lower portion and a dividing circumferential rib—the cable E being attached to the lower portion and is what I designate the "lifting-cable." A dumping-cable H is connected to the upper portion of the drum or windlass, said dumping-cable passing under the pulley E³, then up over a pulley H', mounted upon the top beam B³, and over another pulley H², mounted upon the projecting end of said top beam, the end of said dumping-cable being attached to a ring H³, arranged at the bottom of the side adjacent to the upright standard B². By means of the cables arranged and connected as described the body of the vehicle will be lifted as the drum is revolved by means of the sweep, and after the body has been elevated the desired distance and it becomes necessary to dump the wagon-body and unload its contents the motion of the drum or windlass is reversed and the dumping-cable thrown into engagement with one of the hooks I, arranged upon the upper section of the drawings, and as this reverse motion of the drum continues the lifting-cable is slackened and moves in one direction, while the dumping-cable is continued to be wound upon the drum, thereby causing the wagon-body to be tilted upon one side and the contents dumped over the opposite side.

In order to render the lifting and tilting operations easier, I employ two inclined guide-rods K, which are fastened at their upper ends to the upright standard B and at their lower ends are formed with horizontal base portions K', terminating in pivots K², whereby said guide-rods can be swung into or out of operative position, the upper ends of said rod being pivoted to the upright standards, as most clearly shown in Fig. 1, and are formed with a horizontal shoulder K³. The guide-rods are held in operative position by means of spring-catches K⁴ and are swung upon their pivots after the wagon has been driven into proper position, and the lower portion of each rod will snugly fit the vehicle-wheel, and thereby hold the wagon in firm position. A tubular rod or ordinary piece of pipe L is fastened to the lower edge of the dumping side of the wagon-body by means of suitable hasps, the said pipe having annular shoulders L' intermediate their ends to prevent any lateral movement of the same, and sliding freely pon the guide-rods are the tubular sleeves M, connected to the said guide-rods by means of eyes M', said eyes permitting the free and easy motion of the sleeve upon the guide-rods, and passing through the tubular sleeve and into the tubular pipe are the rods N, having a shoulder N' to prevent passing too far inwardly, and they are prevented from working out by means of a hook or pin N², which passes through an opening in the pipe or tubular rod into an opening in the rod or bar N. It will thus be seen that I provide suitable bearings at each end of the wagon-body which slide upon the inclined guide-rods, and thereby reduce the friction to a minimum and at the same time steady the wagon-body during its ascent.

When the body has been elevated to its full extent, the bearing-rods and sleeves rest upon the shouldered portions of the guide-rods, and the motion of the drum is then reversed and the dumping-cable wound thereon, whereby the wagon-body is caused to turn upon the bearing-rods and sleeve and the entire contents dumped over the side. After the load has been dumped, the dumping-cable is unwound and the elevating-cable rewound, so that the wagon-body is again brought back to a horizontal position, with the bearing-rods resting upon the shouldered portion of the guide-rod, and in order to throw the said bearing portions away from the shoulders I employ the curved tripping-arm O at each end of the wagon-body, said arms being so curved and shaped that their outer ends will rest upon the guide-rods at points slightly below the shoulders, and as the hoisting-cable is slackened these tripping-arms will serve as fulcrums to disengage the bearing portion from the shoulders, said tripping-arms being held against the guide-rod by means of spring-catches O', fastened upon the end of the wagon, and when these arms are not in use they are turned up to a substantially horizontal position and held there by means of the spring-catches O². If desired, these tripping-arms can be dispensed with and the wagon-body can be drawn away from the shoulders of the guide-rods by means of a rope attached to the sides of the wagon-body and passing around a pulley arranged upon the side of the standard B².

The guide-rods can be provided with shoulders intermediate their ends, so that the wagon-body can be stopped and dumped at any elevation desired, and wherever it is necessary to dump the load almost directly over the top of the wheels I employ a depending arm B⁵, which drops from the projecting ends of the top beam B³ and carries a pulley at its lower end, around which the dumping-cable passes, thereby lowering the line of draft to such a point that the wagon-body can be dumped after being elevated a very slight distance.

In case it becomes necessary to use my device in connection with a wagon-body having no appliances whatever, I employ two metallic straps, S-shaped, to receive the wagon-body, and provided with tie-rods R at their upper ends, which extend across the top of the wagon-body and are made fast by means of the hand-nuts R'. The straps S are also provided with barbs S' in order to prevent the wagon-body sliding therein. These metallic straps terminate in rings at their upper ends and have the chains connected therewith, the same as heretofore described, and each strap is also provided with a spring-hasp for the purpose of securing the tubular rod or pipe previously mentioned. The tripping-arm will be dispensed with; but in all other particulars the apparatus will remain substantially the same as before described, from which it will be seen that my invention can be quickly and easily applied to farm-wagons now in use.

In connection with my improved apparatus I may employ a chute T, having a perforated bottom, which is particularly adapted for use when cribbing corn, inasmuch as the dirt and chaff will sift through the perforated bottom, and when unloading small or fine grain a supplemental chute T² is arranged within the perforated chute, and in this manner all waste or loss of grain is avoided.

The operations of the various parts have been fully described in connection with the description of the constructive features fully illustrated in the accompanying drawings, and it will be clearly seen that I provide a simple and comparatively cheap device which can be hauled about from place to place, quickly set up and taken down, and one which can be used for unloading grain, ice, stones, or other material.

One great advantage of my invention is the simplicity of all the parts, and another advantage is that all of the operations are performed by means of a single drum or windlass, which is capable of moving two ropes in the same or opposite directions at one and the same time.

The adaptability of my invention to wagon-bodies now in use is an advantageous feature which will be appreciated by all.

Having thus fully described my invention, what I claim as new, and desire to secure by Letters Patent of the United States, is—

1. In a device of the kind described, the combination with the base and supporting-frame, of the guide-rods and bearing devices, said bearing devices being connected with the wagon-body, an elevating-cable for lifting the wagon-body along the inclined guide-rods, and the dumping-cable for causing the wagon-body to turn upon the bearing devices and dump upon the side, substantially as shown and described.

2. In a device of the kind described, the combination with the base and supporting-frame, of the guide-rods and bearing devices, the hoisting-cable, the dumping-cable, and the drum to which the said hoisting and dumping cables are connected, substantially as shown and described.

3. In a device of the kind described, the combination with the guide-rods, of the tubular sleeves sliding thereon, the tubular rod or pipe adapted to be attached to a wagon-body and the rods passing through the tubular sleeves into the tubular rod or pipe, substantially as shown and described.

4. In a device of the kind described, the combination with the base and supporting-frame, of the inclined guide-rods pivotally attached to said base and support, and the spring-catches for holding the said guide-rods in an operative position, substantially as shown and described.

5. In a device of the kind described, the combination with a wagon-body, of the tubular rod or pipe attached to one side thereof, the inclined guide-rods having shoulders, the tubular sleeves sliding upon the guide-rods, the connecting-bars passing through the sleeves, the hoisting and dumping cables connected as described and the tripping-arms attached to the wagon-body and adapted to engage the inclined guide-rods for the purpose of throwing the bearing-sleeves away from the shoulders, substantially as shown and described.

6. In a device of the kind described, a drum mounted in a suitable frame and comprising the upper and lower portions, the upper portion having one or more hooks arranged thereon, substantially as shown and described.

7. In a device of the kind described, the drum mounted in a suitable frame and comprising the upper and lower portions, the upper portion having one or more hooks attached thereto, the hoisting-cable attached to the lower portion of the drum, and the dumping-cable attached to the upper portion of the drum, substantially as shown and described.

8. In a device of the kind described, the combination with the metallic straps adapted to receive a wagon-body and having rings at their upper ends, of the spring-hasps carried by said straps, the tubular rod or pipe secured by the said hasp, the tubular sleeves and connecting-rods, and the inclined guide-rods, all arranged and adapted to operate substantially as shown and described.

9. In a device of the kind described, the combination with the base and supporting-frame, of the supplemental base and drum, said drum being mounted in a suitable frame and comprising an upper and lower section, the upper section having one or more hooks arranged thereon, the hoisting-cable connected to the lower section, the dumping-cable connected to the upper section, the wagon-body, the tubular rods or pipes connected to said body, the bearing-sleeves and connecting-rods, the inclined guide-rods upon which the bearing-sleeves work, means for connecting the hoisting and dumping cables to the wagon-body, all of said parts being arranged and adapted to operate, substantially as and for the purpose described.

RALPH EGE.

Witnesses:
CHAS. E. BROCK,
CLARENCE SHAW.